United States Patent
Kim et al.

(10) Patent No.: US 10,042,531 B2
(45) Date of Patent: Aug. 7, 2018

(54) METHOD AND APPARATUS OF MODIFYING CONTOUR LINE

(71) Applicant: Samsung Electronics Co., Ltd., Suwon-si (KR)

(72) Inventors: Ye Hoon Kim, Seoul (KR); Kyoung Gu Woo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 288 days.

(21) Appl. No.: 14/511,486

(22) Filed: Oct. 10, 2014

(65) Prior Publication Data
US 2015/0160843 A1    Jun. 11, 2015

(30) Foreign Application Priority Data

Dec. 9, 2013   (KR) .................. 10-2013-0152246

(51) Int. Cl.
*G06F 3/0488* (2013.01)
*G06F 3/0484* (2013.01)
*G06T 11/60* (2006.01)

(52) U.S. Cl.
CPC ........ *G06F 3/04845* (2013.01); *G06F 3/0488* (2013.01); *G06T 11/60* (2013.01); *G06F 2203/04104* (2013.01)

(58) Field of Classification Search
CPC .................................................. G06F 3/0488
USPC ........................................................ 715/764
See application file for complete search history.

(56) References Cited

U.S. PATENT DOCUMENTS

| 5,577,176 | A  | * | 11/1996 | Friedman | G06F 3/038 345/427 |
| 6,911,980 | B1 | * | 6/2005 | Newell | G06T 11/203 345/441 |
| 8,331,685 | B2 | * | 12/2012 | Pettigrew | G06T 7/13 345/619 |
| 9,317,893 | B2 | * | 4/2016 | Chen | G06T 3/0031 |
| 9,383,895 | B1 | * | 7/2016 | Vinayak | G06F 3/017 |
| 2004/0174382 | A1 | * | 9/2004 | Staples | G06F 3/04845 345/619 |
| 2005/0105801 | A1 | * | 5/2005 | Periaswamy | G06T 7/0012 382/192 |
| 2005/0240882 | A1 | * | 10/2005 | Morita | G16H 50/20 715/764 |
| 2005/0254617 | A1 | * | 11/2005 | Nishide | G06T 11/005 378/4 |

(Continued)

*Primary Examiner* — Reza Nabi
*Assistant Examiner* — Daniel Rodriguez
(74) *Attorney, Agent, or Firm* — Jefferson IP Law, LLP

(57) ABSTRACT

A method and an apparatus for modifying a contour line of an object are provided. The method involves displaying a contour line of an object on a screen, receiving a plurality of touch points, matching each of the plurality of the received touch points with corresponding contour line points on the contour line, generating touch point movement data by tracing a movement path of each of the plurality of the received touch points, determining a curvature variation of the contour line based on the touch point movement data, and modifying the contour line by moving each of the corresponding contour line points based on the touch point movement data and applying the curvature variation to a section connected between each of the moved corresponding contour line points to generate the section.

18 Claims, 8 Drawing Sheets

(56) References Cited

U.S. PATENT DOCUMENTS

| | | | | |
|---|---|---|---|---|
| 2006/0119578 | A1* | 6/2006 | Kesavadas | G06F 3/014 345/161 |
| 2009/0063118 | A1* | 3/2009 | Dachille | G06F 17/30262 703/11 |
| 2009/0208409 | A1* | 8/2009 | Summers | A61K 49/0466 424/1.21 |
| 2009/0248184 | A1* | 10/2009 | Steingart | A61C 1/082 700/98 |
| 2010/0149109 | A1* | 6/2010 | Elias | G06F 3/04845 345/173 |
| 2010/0162181 | A1* | 6/2010 | Shiplacoff | G06F 3/0485 715/863 |
| 2010/0214312 | A1* | 8/2010 | Weber | G06T 13/80 345/593 |
| 2011/0064288 | A1* | 3/2011 | Shinagawa | G06T 7/0012 382/128 |
| 2011/0087999 | A1* | 4/2011 | Bichsel | G06F 3/04817 715/845 |
| 2011/0102464 | A1* | 5/2011 | Godavari | G06F 3/0416 345/650 |
| 2011/0115745 | A1* | 5/2011 | Cabrera Cordon | G06F 3/0488 345/175 |
| 2011/0164029 | A1* | 7/2011 | King | G06F 3/04883 345/419 |
| 2011/0216951 | A1* | 9/2011 | Ye | G06T 7/0012 382/128 |
| 2011/0271215 | A1* | 11/2011 | Piper | A61B 6/469 715/764 |
| 2012/0254747 | A1* | 10/2012 | Bocirnea | G06F 3/04845 715/702 |
| 2012/0303548 | A1* | 11/2012 | Johnson | G06Q 40/04 705/36 R |
| 2012/0324332 | A1* | 12/2012 | Zaragoza | G06F 9/4443 715/234 |
| 2013/0047119 | A1* | 2/2013 | Lee | G06F 3/04883 715/800 |
| 2013/0321858 | A1* | 12/2013 | Takabatake | H04N 1/00408 358/1.15 |
| 2013/0329058 | A1* | 12/2013 | Brossette | G06K 9/4638 348/207.1 |
| 2013/0332868 | A1* | 12/2013 | Kaftan | G06F 3/0481 715/764 |
| 2014/0022194 | A1* | 1/2014 | Ito | G06F 3/0488 345/173 |
| 2014/0098142 | A1* | 4/2014 | Lee | G06F 3/04845 345/676 |
| 2014/0165000 | A1* | 6/2014 | Fleizach | H04M 19/04 715/810 |
| 2014/0292802 | A1* | 10/2014 | Chen | G06T 3/0031 345/609 |
| 2014/0337783 | A1* | 11/2014 | Allen | G06F 3/04845 715/771 |
| 2015/0057982 | A1* | 2/2015 | Erdman | G06F 17/50 703/1 |
| 2015/0363080 | A1* | 12/2015 | Buelow | G06T 19/20 715/783 |
| 2016/0143576 | A1* | 5/2016 | Symon | A61B 8/085 600/411 |
| 2016/0260211 | A1* | 9/2016 | Gillies | G06T 7/41 |

* cited by examiner (a)

(b)

(a)

(b)

(a)

(b)

METHOD AND APPARATUS OF MODIFYING CONTOUR LINE

CROSS-REFERENCE TO RELATED APPLICATION(S)

This application claims the benefit under 35 USC 119(a) of Korean Patent Application No. 10-2013-0152246 filed on Dec. 9, 2013, in the Korean Intellectual Property Office, the entire disclosure of which is incorporated herein by reference for all purposes.

BACKGROUND

1. Field

The following description relates to a method and an apparatus of modifying a contour line of an object in an image.

2. Description of Related Art

In the field of diagnostic medicine, diagnostic imaging technologies that use radioactive or ultrasonic waves to detect lesions are currently under development to achieve early detections of medical conditions within the human body. An image for diagnosis, or a diagnostic image, generated by such a diagnostic imaging technology may include a portion that corresponds to a suspected lesion. However, the portion of the image corresponding to the lesion may overlap with various anatomical structures of the human body. Thus, it is important to accurately separate a boundary of the lesion from the entire image for an accurate diagnosis. In other words, it is important to distinguish a contour line or a boundary of the object that corresponds to the lesion within the image.

A Computer-Aided Diagnosis (CAD) apparatus is a diagnosis support apparatus used to process a diagnostic image and to determine lesions of interest in the diagnostic image. The lesion determined by the CAD apparatus may correspond to an object simply extracted by image processing, and the ultimate determination of whether the lesion is malignant or benign may need to be performed by a user, such as a physician or a radiologist. Therefore, it is necessary to provide an interface that enables the user to generate and/or modify the contour line of the lesion that is determined in the CAD apparatus.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of modifying a contour line involves displaying a contour line of an object on a screen, receiving a plurality of touch points, matching each of the plurality of the received touch points with corresponding contour line points on the contour line, generating touch point movement data by tracing a movement path of each of the plurality of the received touch points, determining a curvature variation of the contour line based on the touch point movement data, and modifying the contour line by moving each of the corresponding contour line points based on the touch point movement data and applying the curvature variation to a section connected between each of the moved corresponding contour line points to generate the section.

The moving of each of the corresponding contour line points may involve calculating a variation of each of the corresponding contour line points based on the touch point movement data and moving each of the corresponding contour line points based on the variation. The applying of the curvature variation may involve applying the curvature variation to the section connected between each of the moved corresponding contour line points and generating the section to modify the contour line. The general aspect of the method may further involve displaying the modified contour line on the screen.

Each of the corresponding contour line points may be a point that is on the contour line, a coordinate of the point being closest to a coordinate of each of the plurality of the touch points.

The touch point movement data may include: coordinates of at least two points among points on a path of each of the plurality of the touch points, which is consecutively dragged and moved with the touch point touched on the screen from a start point, where each of the plurality of the touch points is input, to an end point where the touching ends; a distance between each of the plurality of the touch points; and a number of the plurality of the touch points.

The touch point movement data may include at least one of a movement distance, duration of the movement, a movement direction, an average speed during a course of the movement, and an average velocity during the course of the movement, of each of the plurality of the touch points.

The variation of each of the corresponding contour line points may be calculated based on at least one of a movement distance, duration of the movement, a movement direction, an average speed during a course of the movement, and an average velocity during the course of the movement, of each of the plurality of the touch points.

The curvature variation of the contour line may be determined based on a variation setting value.

The curvature variation of the contour line may be determined based on at least one of a movement distance, duration of the movement, a movement direction, an average speed during a course of the movement, and an average velocity during the course of the movement, of each of the plurality of the touch points.

The curvature variation of the contour line may be determined based on a distance between a position where each of the plurality of the touch points is input and a position of each of the corresponding contour line points with respect to each of the plurality of the touch points.

The curvature variation of the contour line may be determined based on a size of a distance between the plurality of the received touch points.

The curvature variation of the contour line may be determined based on a number of the plurality of the received touch points.

In another general aspect, an apparatus for modifying a contour line includes a display screen configured to display a contour line of an object, a touch input device configured to receive a plurality of touch points regarding the object, a processor configured to match each of the plurality of the received touch points with corresponding contour line points on the contour line displayed on the display screen, to generate touch point movement data by tracing a movement path of the plurality of the received touch points, to determine a curvature variation of the contour line based on the touch point movement data, and to modify the contour line by moving each of the corresponding contour line points based on the touch point movement data and applying the curvature variation to a section connected between each of the moved corresponding contour line points to generate the section, in which the display screen is configured to display the modified contour line.

The general aspect of the apparatus may further include a computer-readable medium configured to store computer-executable instructions. The processor may be configured to calculate a variation of each of the corresponding contour line points based on the touch point movement data and use the variation to move each of the corresponding contour line points, the curvature variation being applied to a section connected between each of the moved corresponding contour line points to generate the section.

The touch input device and the display screen may be included in one touch screen device.

The touch point movement data may include coordinates of at least two points among points on a path of each of the plurality of the touch points, which is consecutively dragged and moved with the touch point touched on the display screen from a start point, where each of the plurality of the touch points is input, to an end point where the touching ends; a distance between each of the plurality of the touch points; and a number of the plurality of the touch points.

The touch point movement data may include at least one of a movement distance, duration of the movement, a movement direction, an average speed during a course of the movement, and an average velocity during the course of the movement, of each of the plurality of the touch points.

The variation of each of the corresponding contour line points may be calculated based on at least one of a movement distance, duration of the movement, a movement direction, an average speed during a course of the movement, and an average velocity during the course of the movement, of each of the plurality of the touch points.

The curvature variation of the contour line may be determined based on a variation setting value.

The curvature variation of the contour line may be determined based on at least one of a movement distance, duration of the movement, a movement direction, an average speed during a course of the movement, and an average velocity during the course of the movement, of each of the plurality of the touch points.

The curvature variation of the contour line may be determined based on a distance between a position where each of the plurality of the touch points is input and a position of each of the corresponding contour line points with respect to each of the plurality of the touch points.

The curvature variation of the contour line may be determined based on a size of a distance between the plurality of the received touch points.

The curvature variation of the contour line may be determined based on a number of the plurality of the received touch points.

In another general aspect, an apparatus for modifying a contour line includes a touch screen configured to display a contour line of an object, and a processor configured to receive a plurality of touch points regarding the object via the touch screen, to match each of the plurality of the received touch points with corresponding contour line points, and to generate touch point movement data by tracing a movement path of the plurality of the received touch points, in which the touch screen is configured to display a modified contour line based on the generated point movement data, and the modified contour line is obtained by determining new locations of the corresponding contour line points in the modified contour line based on the touch point movement data.

The processor may be configured to construct the modified contour line by determining a curvature variation of the contour line based on the touch point movement data and connecting each of the new locations of the corresponding contour line points based on the curvature variation.

The touch point movement data may include at least one of a movement distance, duration of the movement, a movement direction, an average speed during a course of the movement, and an average velocity during the course of the movement, of each of the plurality of the touch points.

Other features and aspects will be apparent from the following detailed description, the drawings, and the claims.

Figure 1:
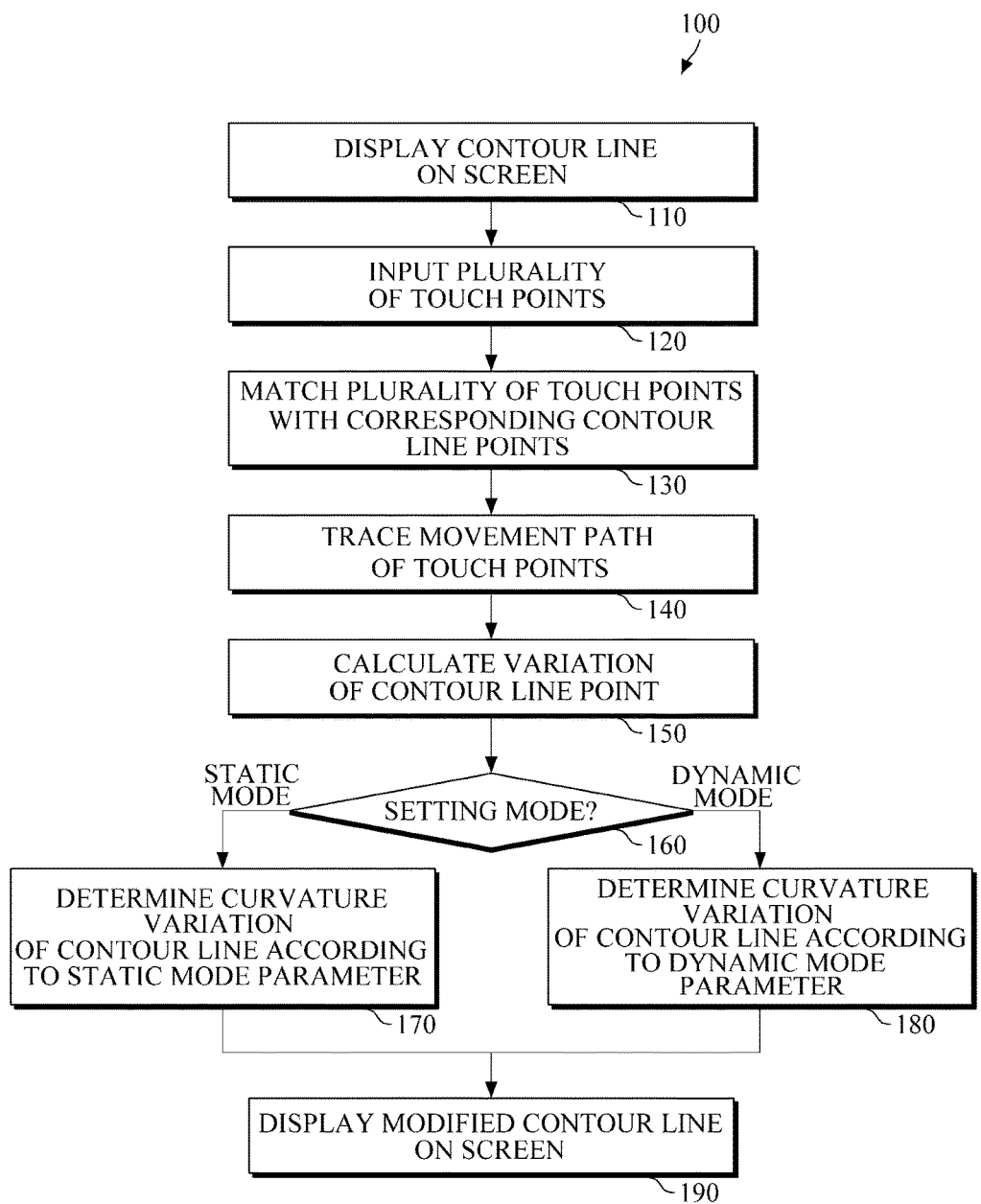
FIG. 1 is a flowchart illustrating an example of a method of modifying a contour line of an object in an image.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

A Computer-Aided Diagnosis (CAD) apparatus may include an interface that allows a user to modify a contour line of an object, such as a lesion extracted within an ultrasound image for instance, and allows the user to complete the contour line of the object in a precise form to correct inaccuracies resulting from the computer-based detection of the lesion. To that end, according to an embodiment according to the present disclosure, there are provided a method and an apparatus for modifying an object contour line within an image, which help a user to intuitively and quickly work through the image by using a delicate, precise, and easy manipulation that involves multi-touch.

Here, the term "multi-touch" denotes an operation in which two or more points are simultaneously touched (or contacted) on a touch input device, such as a touch panel or a touch screen, by using two or more input devices (for example, user's fingers or a touch pen). Here, the expression "two or more points are simultaneously touched (or contacted)" literally includes an operation of simultaneously touching in terms of time; however, the operation is not limited to the meaning mentioned above. For example, a plurality of points simultaneously and/or consecutively touched within predetermined time periods, such as 0.1 or 0.5 seconds, can be recognized as touched simultaneously.

FIG. 1 is a flowchart illustrating an example of a method of modifying a contour line of an object in an image.

According to one example, a method 100 of modifying a contour line of an object in an image may be embedded between or implemented as a part of a Computer-Aided Diagnosis (CAD) method. The method may be installed and implemented on computing devices, such as an ultrasonic diagnostic image device, a desktop, a laptop, a tablet computer, and/or a smartphone, or implemented as an computer-executable add-in, a utility, a routine, a module, computer-executable instructions, or a software program. However, the method of modifying a contour line of an object is not limited thereto. As such, in an example in which the method 100 is implemented by a computer-executable add-in, utility, a routine, a module, a computer-executable instruction, or a software program, a computing device that executes the method 100 may be provided as a hardware apparatus for modifying a contour line of an object in an image.

According to one example, an apparatus for modifying a contour line of an object in an image may include a processor, a touch input device, a display device, and computer-executable instructions that implement the processor to execute a method 100 for modifying a contour line of an object in an image. The touch input device and the display device may be implemented as one touch screen, which has a touch input pad or a touch surface via which touch or contact is taken as input while displaying an image to a user.

Referring to FIG. 1, an example of a method 100 of modifying a contour line of an object in an image involves operations of: displaying a contour line on a screen in 110; inputting one or more touch points in 120; matching the touch points to contour line points (hereinafter referred to as "corresponding contour line points") in 130; tracing the path of movement of the touch points in 140; calculating a variation of the corresponding contour line points in 150; checking a mode in 160; in the event that the mode is a static mode, determining a curvature variation of a contour line according to static mode parameter in 170; in the event that the mode is a dynamic mode, determining a curvature variation of a contour line according to a dynamic mode parameter in 180, and displaying contour line modification in 190.

Figure 2:
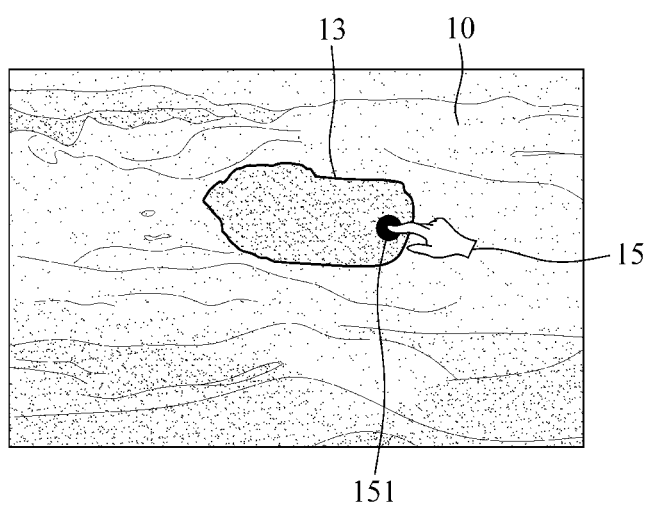
FIG. 2 is a diagram illustrating an example of a method of modifying a contour line of an object in an image.

In 110, a processor displays a contour line of an object in an image on a display screen. FIG. 2 illustrates an example of a contour line displayed on a screen in operation 110 of the method in FIG. 1. Referring to FIG. 2, a contour line 13 is displayed as being overlaid or superimposed on an image 10, on a display device, such as a touch screen of a flat panel display. The contour line 13 may be generated manually or automatically by using, for example, a contour line division algorithm, a seed point, or a seed shape, and the like, that may be included in a Computer-Aided Diagnosis (CAD) apparatus.

Referring to FIG. 2, first, a contour line 13 is generated along a boundary of a predetermined object inside an image 10, and is displayed with the image 10 on a screen. A user can then input a touch point 151 by touching the contour line 13 displayed on the screen, or by touching an adjacent location. According to one example, the user can multi-touch the screen using two to five fingers of a hand 15, or even two to ten fingers of both hands.

For example, the image 10 may be an ultrasound image of a part of a breast that has been taken to diagnose breast cancer. An object around which the contour line 13 is drawn may indicate a lesion that has a possibility of being diagnosed as breast cancer. In this operation 110, the shown contour line 13 may be delicately and precisely adjusted so as to fit the boundary of the object for a more precise diagnosis. According to one example, a multi-touch technology for modifying a contour line to perfectly fit a boundary of an object is provided.

Figure 3:
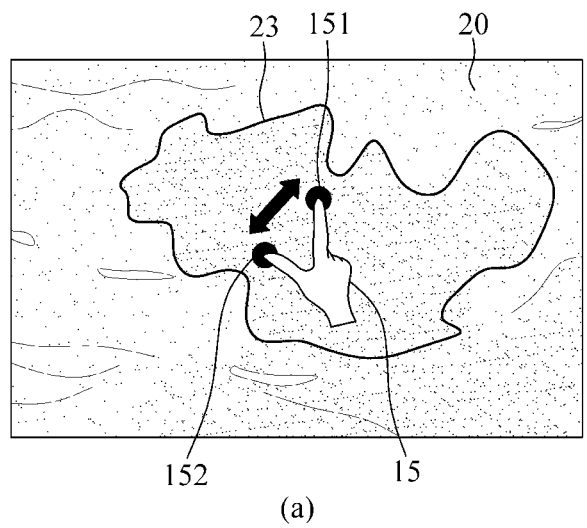
FIG. 3 is a diagram illustrating an example of modifying a contour line by using a multi-touch point inside a contour line according to an example of a method of modifying a contour line of an object inside an image.
Figure 3:
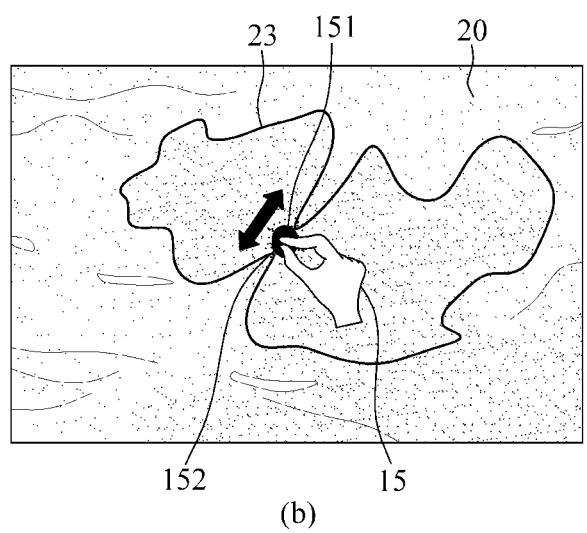
Figure 4:
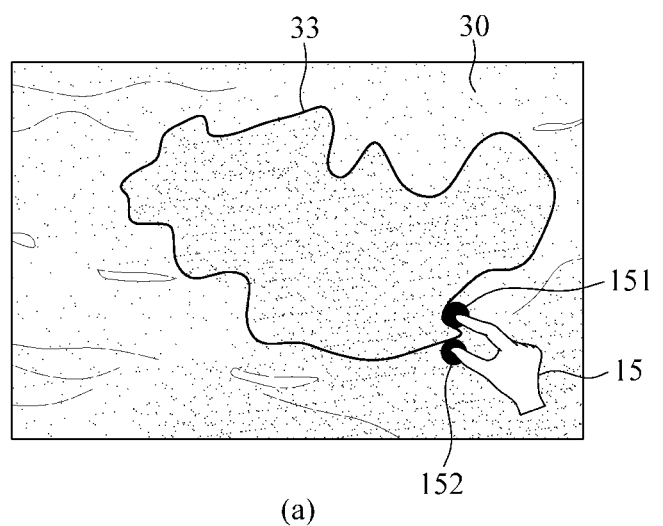
FIG. 4 is a diagram illustrating another example of modifying a contour line by using a multi-touch point outside a contour line according to an example of a method of modifying a contour line of an object inside an image.
Figure 4:
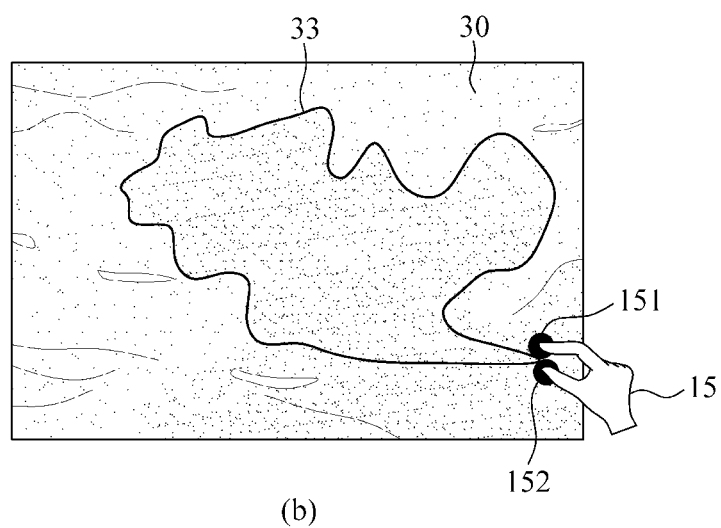
Figure 5:
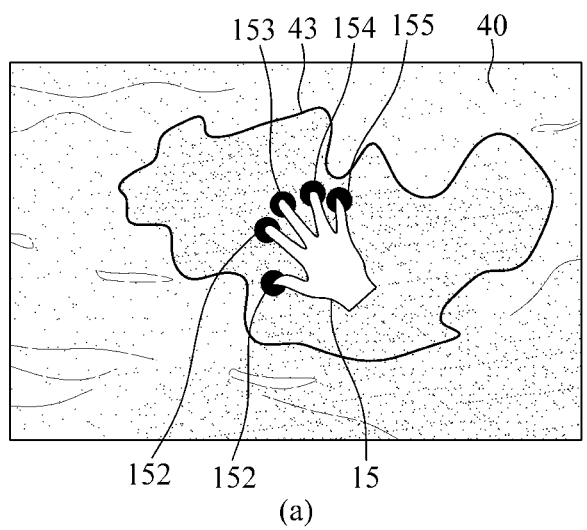
FIG. 5 is a diagram illustrating another example of modifying a contour line by using a multi-touch point inside a contour line according to an example of a method of modifying a contour line of an object inside an image.
Figure 5:
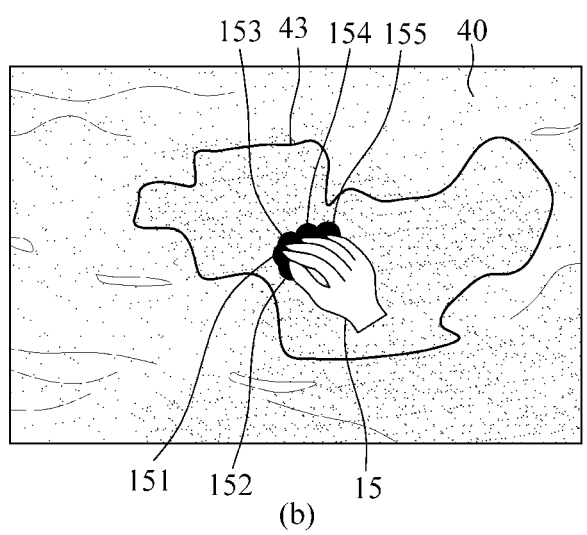

FIGS. 3 to 5 illustrate examples of a user modifying a contour line through multi-touch using fingers.

FIG. 3 is a diagram illustrating an example for modifying a contour line by using multi-touch points inside the contour line according to an exemplary embodiment. Diagram (a) of FIG. 3 illustrates an example of a diagnostic image 20 displayed in a touch screen via which a user inputs two touch points 151 and 152 by using an index finger and a thumb, respectively, of one hand 15 inside a contour line 23 of the image 20. In this example, the user drags the two touch points 151 and 152 touched by the index finger and thumb, respectively, in a direction moving the touch points 151 and 152 toward each other; that is, the user drags the two points 151 and 152 within contour line 23 inward. As a result, the contour line 23 may be modified into a narrowed form where the contour line near the two touch points 151 and 152 is dragged inward from the original position, as shown in diagram (b) of FIG. 3.

FIG. 4 illustrates another example of modifying a contour line by using a multi-touch point inside a contour line, in a method of modifying a contour line of an object in an image according to an exemplary embodiment. Diagram (a) of FIG. 4 illustrates an example of a touch screen via which a user touches two points 151 and 152 outside a contour line 33 of an image 30 by using an index finger and a thumb, respectively, of one hand 15 to elongate a portion of the object. The user drags the two points 151 and 152 in a direction moving away from a contour line 33 with the index finger and thumb touching the two points 151 and 152; that is, the user drags the two points 151 and 152 outward from the center of the object. As a result, the contour line 33 may be modified into a stretched form with a dragged part, as shown in diagram (b) of FIG. 4.

FIG. 5 illustrates another example of modifying a contour line by using multi-touch points inside the contour line, in a method of modifying a contour line of an object in an image according to an exemplary embodiment. Diagram (a) of FIG. 5 illustrates an example in which a user touches the touch screen via five touch points 151, 152, 153, 154, and 155 by using tips of all five fingers, that is, a thumb, index, middle, ring, and little fingers, inside a contour line 43 of an image 40. The user drags in a direction moving all the fingers toward each other; that is, the user drags the five touch points 151, 152, 153, 154, and 155 inward. As a result, the contour line 43 may be modified into a narrowed form where the contour line near the five touch points 151, 152, 153, 154, and 155 is dragged inward, as shown in diagram (b) of FIG. 5.

Referring to FIG. 1 again, according to one example, a processor receives a plurality of touch points that are input by two or more fingers through a touch screen, after a contour line is displayed on a screen in 110.

For example, the user may touch the screen with a touch input tool or body parts, such as two or more fingers or a touch pen. The apparatus will provide the coordinates of each touch point to a processor of the apparatus.

Then, to match a corresponding contour line point for each of the touch point in 130, the processor may match one of points included on the contour line that is already displayed on the screen with respect to each received touch point one by one. A single corresponding contour line point may be matched with a single touch point. In another example, a plurality of corresponding contour line points may be matched with respect to a single touch point.

According to one embodiment, a standard used to match the corresponding contour line point with respect to a predetermined point may be a distance between the two points. That is to say, a point on a contour line located at a distance closest to a specific touch point may be matched with the specific touch point after it is determined as the corresponding contour line point. The distance between the touch point and the contour line point may be calculated based on each of the coordinates.

Here, the "point" may represent one pixel and/or a lump of pixels in the image. If a touch point includes one pixel, coordinates of the touch point may indicate coordinates within the image of the corresponding pixel. The image is generally displayed on a rectangular screen two-dimensionally, and each pixel has a specific location within the image. Thus, the pixel location may, for example, be shown by using two-dimensional coordinates of $\{X, Y\}$ based on a left lower end of the image. If the touch point includes a lump of pixels, the coordinates of the touch point may be determined based on one pixel chosen according to a standard that is set in advance among the lump of pixels. For example, the pixel located in the most central point among the lump of pixels may be determined as the standard.

The thickness of a contour line may correspond to one pixel or a plurality of pixels, and may have the different number of pixels depending on the location. The coordinates of the contour line point may be, similar to the coordinates of the touch point, determined based on the pixels included in the contour line point, or based on one pixel chosen among the pixels.

For example, if the coordinates of the contour line point is $\{x1, y1\}$, and the coordinates of the touch point is $\{x2, y2\}$, a distance between the two coordinates may be determined by function 1.

$$S=|(x1-x2)^2-(y1-y2)^2| \qquad (1)$$

Figure 6:
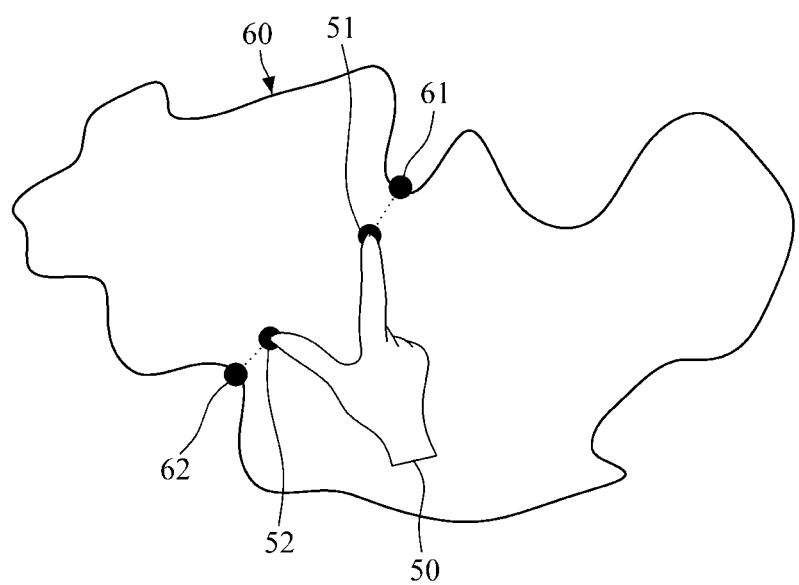
FIG. 6 is a diagram illustrating an example of a matching process between a touch point and a contour line point according to an example of a method of modifying a contour line of an object in an image.

FIG. 6 illustrates an example of a matching process between a touch point and a contour line point in a method of modifying a contour line of an object in an image. Referring to FIG. 6, in the illustrated example, a user inputs two touch points 51 and 52 by touching two locations that are inside a contour line 60 displayed through a touch screen, using a thumb and an index finger of one hand 50. In this example, a processor may be provided with the coordinates of the two touch points 51 and 52 from the touch screen. Also, the processor may check data with respect to the contour line 60, and determine two corresponding contour line points 61 and 62 that are the closest to the two touch points 51 and 52. Based on the determination, the closest two corresponding contour line points 61 and 62 are matched to the two touch points 51 and 52, and the movement of the two touch points 51 and 52 are used to determine changes to the positions of the contour line points 61 and 62.

Referring back to FIG. 1, if a user touches the contour line or touches a location in the vicinity or close proximity of the contour line so as to input a plurality of touch points with, for example, two fingers as in 120, a processor starts a process of matching corresponding contour line points to each touch point in 130. At the same time or later, the user drags his/her fingers on the touch screen without detaching them from the touch screen so that the user can move the touch points in a desired direction, along a desired distance, and/or at a desired speed. Then, the processor may trace a path on which the plurality of the touch points move, and generate data of touch point movements in 140.

The generated data of touch point movements may include point coordinates included in a trace where the touch points are dragged. The traces, which are drawn while the touch points are dragged, include start points, end points, and all points therebetween. The start point is a position where the touch point is input. The end point is a position where the finger touching is ended after a touch point has been dragged and moved from the start point with the fingers on it.

It is desirable that the data of touch point movements includes coordinates of at least two points among the points that are included in the traces where the touch points move. For example, the data of touch point movements may include coordinates of the start point and the end point. Alternatively, the data of touch point movements may include coordinates of the start point, the end point, and the points therebetween.

In addition, the data of touch point movements may include a distance between each separate touch point, and the number of touch points. For example, in case of two touch point traces, the distance between the touch points may represent a distance between each start point, and/or a distance between each end point, of a first touch point trace and a second touch point trace. The number of the touch points is the number of the inputted touch points. For example, if a user's one hand is a touch input tool, the number of the touch points may be 2 to 5.

Also, the data of touch point movements may include at least one of the following: a movement distance, duration of the movement, a movement direction, and an average speed or an average velocity during the course of the movement, of each touch point. The movement distance may be generated by calculating the distance between the two points, namely, the start point and the end point, on the trace of the touch point. Alternatively, the movement distance may be generated by directly calculating a length of a curved line where the touch point is dragged. The duration of movement may be generated by calculating an elapsed time from the start point of the touch point on the trace to the end point by using, for example, a timer built inside the processor. The movement direction may be calculated by obtaining a two-dimensional vector of the two points, namely, the start point and the end point on the trace of the touch point. The average speed or average velocity during the course of movement may be calculated through a basic dynamic equation (speed=distance/time) by using the movement distance, time, and direction.

To generate data regarding the touch point movements, a movement amount of each corresponding contour line point is calculated as a variation of the contour line point based on the generated data of touch point movements in 150. That is, based on the movement amount of a specific touch point, the movement amount of the corresponding contour line point matched to the specific touch point is calculated. The movement amount of the corresponding contour line point is a variation of the corresponding contour line point. For example, the corresponding contour line point may be moved in the direction and distance identical to the movement distance and direction of the touch point. In another example, the corresponding contour line point may be moved less than the movement distance of the touch point, and in the same direction as the movement direction of the touch point. In another example, the corresponding contour line point may be moved greater than the movement distance of the touch point, and in the same direction as the movement direction of the touch point.

The contour line is a form of a curved line of consecutive points; meanwhile, the corresponding contour line points are composed of about 2 to 5 points spaced apart. Thus, a form of the contour line cannot be changed until positions of other contour line points around the corresponding contour line point are changed. The position change of other contour line points around the corresponding contour line point may be presented as "a curvature variation of the contour line".

Figure 7:
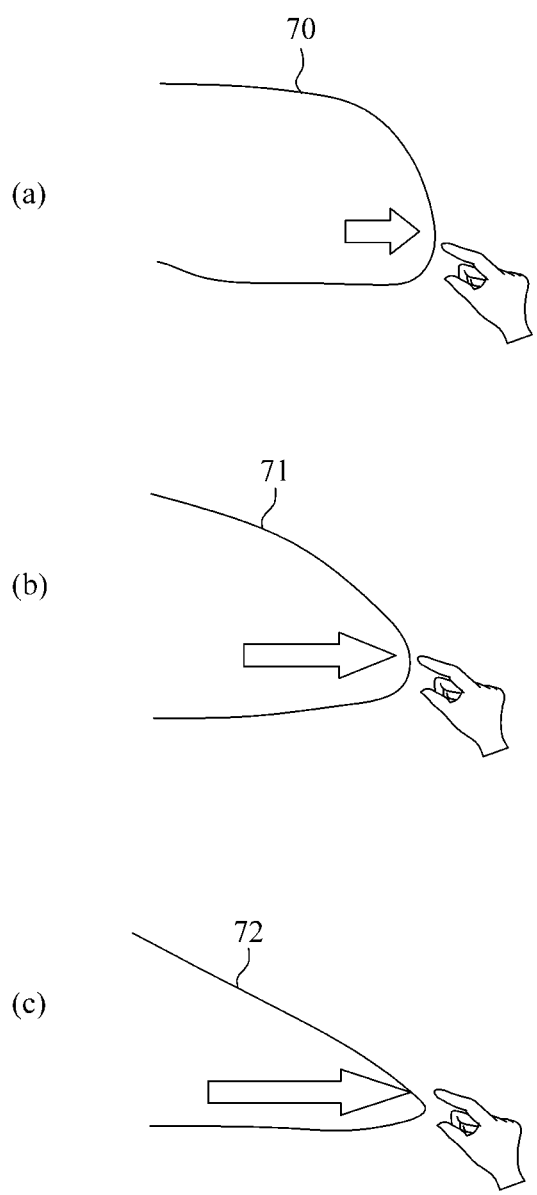
FIG. 7 is a diagram illustrating an example of a curvature variation of a contour line according to an example of a method of modifying a contour line of an object inside an image.

FIG. 7 illustrates an example of a process of adjusting a curvature of a contour line according to an example of a method of modifying a contour line of an object in an image. Diagram (c) of FIG. 7 illustrates a contour line 72 with a relatively smaller curvature. The contour line 72 has a pointed form. Diagram (b) of FIG. 7 illustrates a contour line 71 with a curvature larger than the curvature illustrated in diagram (c) of FIG. 7, but smaller than the curvature illustrated in diagram (a) of FIG. 7. Diagram (a) of FIG. 7 illustrates a contour line 70 with a relatively greater curvature, that is, a contour line 70 of a round form.

The detailed process of making various changes in the contour line curvature by using multi-touch, as illustrated in diagrams (a) to (c) of FIG. 7, is described in relation to the following operations 160, 170, and 180 of setting the curvature variation of FIG. 1.

Referring to FIG. 1 again, operations 160, 170, and 180 of setting the curvature variation of the contour line according to one example may be performed based on the data of touch point movements at the same time as or sequentially following the operation 150 of calculating the variation of the contour line point.

First, it is determined whether the curvature variation of the contour line is to be set by a static mode or by a dynamic mode in 160. If determined to be set by the static mode, the curvature variation of the contour line is set according to a static approach, that is, a static mode parameter in 170. If determined to be set by the dynamic mode, the curvature variation of the contour line is set according to a dynamic approach, that is, a dynamic mode parameter in 180.

If the setting mode is set as the static mode, the curvature variation of the contour line may be set according to the static mode parameter. The static mode parameter may be a variation setting value, which in advance sets a level of the curvature variation of the contour line that is to be changed, such as a 10% increase, 20% increase, and 30% increase, etc., to the movement direction of the touch point. A user can set the static mode parameter to apply desired curvature variation by selecting one of various static mode parameters when setting the mode and setting the static mode parameter. In this example, in response to the user dragging and moving the touch point, the curvature variation may be set by the static mode parameter that is set to move the touch point, e.g., to the movement direction where the touch point is dragged.

In the event that the setting mode is set as the dynamic mode, the curvature variation of the corresponding contour line may be set according to the dynamic mode parameter in 180. The dynamic mode parameter may set the curvature variation of the contour line according to at least one among a movement distance of each touch point, duration of the movement, a movement direction, an average speed or an average velocity during the course of the movement. The user can set the dynamic mode parameter to apply a desired curvature variation by selecting one of various dynamic mode parameters when setting the mode and setting the static mode parameter.

According to one example, the dynamic mode parameter may set the curvature variation of the contour line to be changed, e.g., the faster a dragging speed of fingers, the sharper the contour line, or the slower the dragging speed, the duller the contour line. This case may be similar to a user's experience in that, when a line is drawn with a real brush, a sharp line is drawn if drawn quickly, and is softer and blunt if drawn slowly.

In another embodiment, the dynamic mode parameter may set the curvature variation of the contour line according to a size of a distance between a position where each touch point is input and the contour line point corresponding to each touch point, which enables a user to intuitively adjust a degree of how pointed the contour line is, according to the distance between the input touch point and the contour line. For example, if the touch point is input near the contour line, the contour line curvature may be changed to be smaller, namely, more pointed or less round; however, if the touch point is input far from the contour line, the contour line curvature may be changed to be larger, namely, rounder.

In another embodiment, the dynamic mode parameter may set the curvature variation of the contour line according to a size of a distance between input touch points. For example, in response to the user touching the screen with his/her thumb and index finger and narrowing the distance therebetween, the contour line may be changed to be less round or narrower; however, if the user touches with the thumb and index finger so as to widen the distance therebetween, the contour line may be changed to be rounder or thicker between the thumb and the index finger.

In another embodiment, the dynamic mode parameter may set the curvature variation of the contour line according to the number of the input touch points. For example, touching only with two fingers may make the contour line to be changed to a less-round shape; however, touching with five fingers may make the contour line to be changed to be a rounder shape.

Referring to FIG. 1 again, according to one example, if a variation of each contour line point and a curvature variation of the contour line between each of the contour line points are set, a variation of a corresponding contour line point and the curvature variation of the contour line may be applied to modify the contour line, which is displayed on a screen in 190. The modifying of the contour line may be performed by applying a variation of each corresponding contour line point so as to move the corresponding contour line points, also applying the curvature variation of a contour line part between the moved corresponding contour line points, and forming the contour line.

The embodiments, as described above, may shorten the task duration of adjusting the contour line around an object such as a lesion in a medical image by allowing the user to use multi-touch points, that is, a plurality of touch points, in correcting the contour line, in comparison to a task of modifying the contour line using a pointing device, such as an existing mouse. Since an input device, such as a mouse, cannot input a plurality of points at the same time, there are limitations in manipulation technology. According to an embodiment, the contour line may be manipulated with, for example, two or more fingers by inputting a plurality of points on a touch screen at the same time. Thus, various methods of modifying a contour line may be offered to the user.

Figure 8:
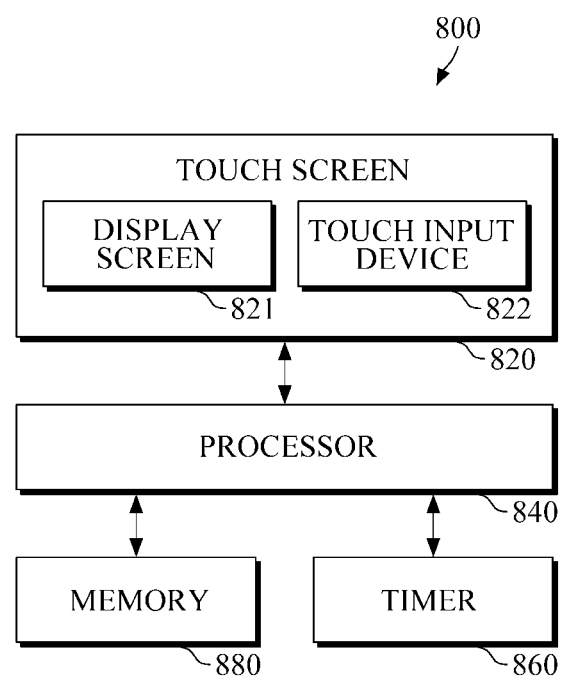
FIG. 8 is a diagram illustrating an example of an apparatus for modifying a contour line of an object in an image.

FIG. 8 illustrates an example of an apparatus for modifying a contour line of an object in an image.

Referring to FIG. 8, according to one example, an apparatus 800 for modifying a contour line of an object includes a touch screen 820, a processor 840, a timer 860, and a memory 880.

The touch screen 820 is a device including a touch input device 822 and a display screen 821. The touch screen 820 may a part of a display, and the touch input device may be a touch input pad of the touch screen 820. The touch input device 822 and the display screen 821 may be implemented through the same surface via which an image is displayed and touch input may be detected. A user may input a desired command through actions, such as tapping, sliding, or drawing a specific position in an image displayed on the touch screen 820, by using fingers or a touch pen. Even if the apparatus 800 for modifying the contour line of an object in an image includes the touch screen 820 with the touch input device 822 and the display 821 as illustrated in FIG. 8, embodiments of the apparatus is not limited to this configuration. For example, the apparatus 800 may include a touch panel as the touch input, and also include a monitor, which is connected separately to the touch panel, as the display.

A software program, which implements the method of modifying a contour line of an object in an image according to the embodiments mentioned above, may be installed and executed in the processor 840. Also, the software program may include a microprocessor, a Central Processing Unit (CPU), programmable Read-Only Memory (ROM), Electrically Erasable and Programmable Read-Only Memory (EEPROM), and the like, but the processor is not limited thereto.

In the example illustrated in FIG. 8, the processor 840, the timer 860, and the memory 880 are each shown as separate components; however, the apparatus 800 is not limited only to such a configuration. For example, the processor 840 may include the timer 860, and/or the memory 880.

Also, the processor 840 is illustrated as a single component in FIG. 8, but the exemplary embodiments are not limited to such configuration. The processor 840 may be implemented as not one component but two or more separate components. The processor may be implemented using one or more general-purpose or special-purpose computers, such as, for example, a controller and an arithmetic logic unit, a digital signal processor, a microcomputer, a field-programmable array, a programmable logic unit, a microprocessor, or any other device capable of running software or executing instructions. The processor may run an operating system (OS), and may run one or more software applications that operate under the OS. If the processor 840 is implemented as two or more components, the components may be implemented in a form of being included in one single device, as well as in a form of a distributed apparatus cooperating with each other through communication networks.

The timer 860 may be generally a component equipped necessarily in the processor 840.

The memory 880 includes volatile and/or non-volatile memory, and removable and non-removable memory, and is a computer-readable medium that stores instructions of implementing a software program that implements the method according to the exemplary embodiments mentioned above. For example, the memory 880 may include ROM, Random-Access Memory (RAM), a floppy disk, a hard disk, a Solid State Drive (SSD), an optical disc, CD, DVD, USB, flash memory, a magnetic disk, magnetic tape, and the like, but the memory 880 is not limited thereto.

In an embodiment, an apparatus for modifying a contour line of an object in an image may include a computer-readable medium that stores computer-readable instructions. The 'computer-readable medium' may include a non-transitory storage medium, which stores instructions, and a signal medium for communication, which includes instructions.

The storage medium may include memory 880 of FIG. 8, cache memory equipped inside the processor 840 of FIG. 8, volatile and/or non-volatile memory, a removable and non-removable medium. The signal medium for communication is a medium configured in a modulated signal form for communication, such as a carrier wave, and may code computer-executable instructions in a random signal form which a computing device uses for local and/or remote communications through wire and/or wireless communications.

The methods and/or operations described above may be recorded, stored, or fixed in one or more non-transitory computer-readable storage media that includes program instructions to be implemented by a computer to cause a processor to execute or perform the program instructions. The media may also include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical discs; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A display unit may be implemented as a liquid crystal display (LCD), a light-emitting diode (LED) display, a plasma display panel (PDP), a screen, a terminal, and the like. A screen may be a physical structure that includes one or more hardware components that provide the ability to render a user interface and/or receive user input. The screen can encompass any combination of display region, gesture capture region, a touch sensitive display, and/or a configurable area. The screen can be embedded in the hardware or may be an external peripheral device that may be attached and detached from the apparatus. The display may be a single-screen or a multi-screen display. A single physical screen can include multiple displays that are managed as separate logical displays permitting different content to be displayed on separate displays although part of the same physical screen.

A user interface may be responsible for inputting and outputting input information regarding a user and/or an image. The interface unit may include a network module for connection to a network and a universal serial bus (USB) host module for forming a data transfer channel with a mobile storage medium. In addition, the user interface may include an input/output device such as, for example, a mouse, a keyboard, a touch screen, a monitor, a speaker, a screen, and a software module for running the input/output device.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method for modifying a contour line in a computer-aided diagnosis (CAD) system, the method comprising:
   displaying, on a screen, a first contour line indicating a lesion included in a medical image captured by a diagnosis device;
   detecting a plurality of touch inputs on the screen;
   determining a plurality of contour line points corresponding to the detected plurality of touch inputs, the plurality of contour line points being located on the displayed first contour line, and a coordinate of each contour line point being closest to a coordinate of each touch input;
   determining first information for variation of each contour line point based on a movement of each of the detected plurality of touch inputs, the first information comprising a value for a movement distance of each contour line point;
   determining second information for a curvature variation of the first contour line based on a distance between the coordinate of each touch input and the coordinate of each corresponding contour line point, the distance determining a size of the curvature variation; and
   displaying a second contour line modified from the first contour line by moving a part of the first contour line based on the determined first information and the determined second information,
   wherein the displaying comprises:
      moving each contour line point based on the determined first information; and
      applying the determined second information to parts connected between each of the moved contour line points.

2. The method of claim 1, wherein the first information comprises at least one of:
   coordinates of at least two points among points on a path of each of the plurality of touch inputs, which is consecutively dragged and moved with a point touched on the screen from a start point, where each of the plurality of touch inputs is input, to an end point where the touching ends;
   a distance between each of the detected plurality of touch inputs; or
   a number of the detected plurality of touch inputs.

3. The method of claim 2, wherein the curvature variation of the first contour line is determined based on the distance between each of the detected plurality of touch inputs.

4. The method of claim 2, wherein the curvature variation of the first contour line is determined based on the number of the detected plurality of touch inputs.

5. The method of claim 1, wherein the first information comprises at least one of the movement distance, the duration of the movement, the movement direction, the average speed during the course of the movement, or the average velocity during the course of the movement of each of the plurality of the touch inputs.

6. The method of claim 5, wherein the value for the movement distance of the at least one contour line point is calculated based on at least one of the movement distance, the duration of the movement, the movement direction, the average speed during the course of the movement, or the average velocity during the course of the movement of each of the plurality of the touch inputs.

7. The method of claim 1, further comprising:
   determining, among a first mode and a second mode, a mode as a setting mode,
   wherein, if the first mode is determined as the setting mode, the curvature variation of the first contour line is determined based on a predetermined variation value, and
   wherein, if the second mode is determined as the setting mode, the curvature variation of the first contour line is determined based on at least one of the movement distance, the duration of the movement, the movement direction, the average speed during the course of the movement, or the average velocity during the course of the movement of each of the plurality of the touch inputs.

8. An apparatus for modifying a contour line in a computer-aided diagnosis (CAD) system, the apparatus comprising:
   a display screen configured to display a first contour line indicating a lesion included in a medical image captured by a diagnosis device;
   a touch input device configured to detect a plurality of touch inputs on the display screen; and
   a processor configured to:
      determine a plurality of contour line points corresponding to the detected plurality of touch inputs, the plurality of contour line points being located on the displayed first contour line, and a coordinate of each contour line point being closest to a coordinate of each touch input, determine first information for variation of each contour line point based on a movement of the detected plurality of touch inputs, the first information comprising a value for a movement distance of each contour line point, determine second information for a curvature variation of the first contour line based on a distance between the coordinate of each touch input and the coordinate of each corresponding contour line point, the distance determining a size of the curvature variation, and control the display screen to display a second contour line modified from the first contour line by moving a part of the first contour line based on the determined first information and the determined second information, wherein the processor is further configured to:
move each contour line point based on the determined first information, and
apply the determined second information to parts connected between each of the moved contour line points.

9. The apparatus of claim 8, further comprising:
a non-transitory computer-readable medium configured to store computer-executable instructions.

10. The apparatus of claim 8, wherein the touch input device and the display screen are included in one touch screen device.

11. The apparatus of claim 8, wherein the first information comprises at least one of:
coordinates of at least two points among points on a path of each of the plurality of touch inputs, which is consecutively dragged and moved with a point touched on the display screen from a start point, where each of the plurality of touch inputs is input, to an end point where the touching ends;
a distance between each of the detected plurality of touch inputs; or
a number of the detected plurality of touch inputs.

12. The apparatus of claim 11, wherein the curvature variation of the first contour line is determined based on the distance between each of the detected plurality of touch inputs.

13. The apparatus of claim 11, wherein the curvature variation of the first contour line is determined based on the number of the detected plurality of touch inputs.

14. The apparatus of claim 8, wherein the first information comprises at least one of the movement distance, the duration of the movement, the movement direction, the average speed during the course of the movement, or the average velocity during the course of the movement of each of the plurality of the touch inputs.

15. The apparatus of claim 14, wherein the value for the movement distance of the at least one contour line point is calculated based on at least one of the movement distance, the duration of the movement, the movement direction, the average speed during the course of the movement, or the average velocity during the course of the movement of each of the plurality of the touch inputs.

16. The apparatus of claim 8,
wherein the processor is further configured to determine, among a first mode and a second mode, a mode as a setting mode,
wherein, if the first mode is determined as the setting mode, the curvature variation of the first contour line is determined based on a predetermined value, and
wherein, if the second mode is determined as the setting mode, the curvature variation of the first contour line is determined based on at least one of the movement distance, the duration of the movement, the movement direction, the average speed during the course of the movement, or the average velocity during the course of the movement of each of the plurality of the touch inputs.

17. An apparatus for modifying a contour line in a computer-aided diagnosis (CAD) system, the apparatus comprising:
a touch screen configured to display a first contour line indicating a lesion included in a medical image captured by a diagnosis device; and
a processor configured to:
detect a plurality of touch inputs on the touch screen,
determine a plurality of contour line points corresponding to the detected plurality of touch inputs based on a distance value between each of the plurality of touch inputs and the first contour line, the plurality of contour line points being located on the displayed first contour line,
determine information for variation of each contour line point based on a movement of the detected plurality of touch inputs, the information for variation comprising a value for a movement distance of each contour line point,
determine a curvature variation of the first contour line based on a distance between a coordinate of each touch input and a coordinate of each corresponding contour line point, the distance determining a size of the curvature variation, and
control the touch screen to display a second contour line modified from the first contour line based on information for the movement of the detected plurality of touch inputs,
wherein the second contour line is obtained by determining new locations of each contour line point in the second contour line based on the information for the movement of the detected plurality of touch inputs and connecting each of the new locations of each contour line point based on the determined curvature variation.

18. The apparatus of claim 17, wherein the information for the detected movement of the plurality of touch inputs comprises at least one of the movement distance, the duration of the movement, the movement direction, the average speed during the course of the movement, or the average velocity during the course of the movement of each of the plurality of touch inputs.

* * * * *